(12) United States Patent
Koike et al.

(10) Patent No.: US 7,300,505 B2
(45) Date of Patent: *Nov. 27, 2007

(54) INK-JET RECORDING INK, INK CARTRIDGE, RECORDING UNIT, INK-JET RECORDING METHOD, INK-JET RECORDING APPARATUS, AND METHOD FOR STABILIZING INK EJECTION

(75) Inventors: Shoji Koike, Yokohama (JP); Yoshihisa Yamashita, Kawasaki (JP); Kohei Watanabe, Tokyo (JP); Hayato Ida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 11/009,091

(22) Filed: Dec. 13, 2004

(65) Prior Publication Data

US 2005/0128271 A1    Jun. 16, 2005

(30) Foreign Application Priority Data

Dec. 12, 2003   (JP)  ............................. 2003-415798

(51) Int. Cl.
*C09D 11/02*   (2006.01)
*G01D 11/00*   (2006.01)

(52) U.S. Cl. ..................................... 106/31.6; 347/100
(58) Field of Classification Search ............... 106/31.6; 347/100

See application file for complete search history.

(56) References Cited

U.S. PATENT DOCUMENTS

| | | | |
|---|---|---|---|
| 5,026,427 A * | 6/1991 | Mitchell et al. ........... 106/31.6 |
| 5,085,698 A | 2/1992 | Ma et al. | |
| 5,221,334 A | 6/1993 | Ma et al. | |
| 5,626,655 A * | 5/1997 | Pawlowski et al. ...... 106/31.27 |
| 5,679,143 A * | 10/1997 | Looman ................... 106/31.43 |
| 5,750,592 A * | 5/1998 | Shinozuka et al. ......... 523/161 |
| 5,954,866 A * | 9/1999 | Ohta et al. ............... 106/31.89 |
| 6,306,204 B1 * | 10/2001 | Lin .......................... 106/31.43 |
| 6,471,321 B1 | 10/2002 | Aono et al. | |
| 6,478,418 B2 * | 11/2002 | Reboa et al. ............... 347/100 |
| 6,630,293 B1 * | 10/2003 | Kuno et al. ................. 430/620 |
| 6,746,527 B1 * | 6/2004 | McElligott et al. ...... 106/31.65 |
| 6,918,955 B2 * | 7/2005 | Yokoyama et al. ...... 106/31.28 |
| 2002/0096085 A1 * | 7/2002 | Gotoh et al. ............. 106/31.86 |
| 2003/0061967 A1 * | 4/2003 | Satoh et al. ............. 106/31.89 |
| 2005/0128269 A1 | 6/2005 | Koike et al. | |

FOREIGN PATENT DOCUMENTS

| EP | 1460111 A1 * | 9/2004 |
|---|---|---|
| JP | 56-147871 | 11/1981 |

* cited by examiner

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

The present invention provides an ink-jet recording ink containing water, a pigment, a dispersing agent for dispersing the pigment, and an anionic surfactant having a critical micelle concentration lower than or equal to 0.0005 mol/L.

17 Claims, 2 Drawing Sheets

INK-JET RECORDING INK, INK CARTRIDGE, RECORDING UNIT, INK-JET RECORDING METHOD, INK-JET RECORDING APPARATUS, AND METHOD FOR STABILIZING INK EJECTION

BACKGROUND OF THE INVENTION

1. Field of the Invention

The present invention relates to ink-jet recording pigment inks (hereinafter simply referred to as "pigment inks"), ink cartridges, and recording units that are suited for ink-jet recording and provide excellent startup properties, anti-sticking properties, and recording head durability after long storage or contact with ink flow passageways. The present invention further relates to ink-jet recording methods, ink-jet recording apparatuses, and methods for stabilizing ink ejection using the above components.

2. Description of the Related Art

Ink-jet recording is a recording method in which ink droplets are ejected from a nozzle by providing energy to the ink to apply the ink to a recording medium such as paper. In recent years, the size of ink droplets ejected from a single nozzle has been reduced to support very high-quality ink-jet recording images at the level of silver-halide photographs. Some currently available ink-jet printers can eject ink droplets with volumes of about 10 pl (picoliters) or less. In addition, support of higher drive frequencies is urgently needed with the increasing demand for higher recording speeds.

In addition to higher definition, ink-jet recording images are required to provide higher fastness (for example, light-fastness). In response to the requirement, pigments are replacing dyes as coloring materials. Japanese Patent Laid-Open No. 56-147871, for example, proposes a recording liquid (ink) at least containing an aqueous medium, a pigment, a polymer dispersing agent, and a nonionic surfactant.

In addition, U.S. Pat. Nos. 5,221,334 and 5,085,698 propose the use of a block copolymer having hydrophilic and hydrophobic segments as a dispersing agent for dispersing a pigment. Currently, however, the study for supporting the creation of images with higher definition at higher speed has not been sufficiently conducted on inks containing a pigment in comparison with dye inks.

Under such circumstances, the present inventors have studied the feasibility of creating ink-jet recording images with higher definition at higher speed using an ink prepared by dispersing a pigment in an aqueous medium with a dispersing agent. In the series of studies, the present inventors have found that not only a pigment and dispersing agent but also a surfactant often plays an important role in terms of the properties of pigment inks, including ejection stability, storage stability, and, particularly, durability for use in thermal heads. Among various surfactants, nonionic and anionic surfactants are preferred and widely used for ink-jet inks.

A pigment ink containing a nonionic surfactant is less susceptible to pH and other ionic materials. This type of surfactant, however, tends to increase the viscosity of the ink. Such a viscous ink causes ejection defects due to partial evaporation of the ink components at the end of a nozzle, thus exhibiting poor startup properties (the ejection stability of an ink from a nozzle suspended temporarily from ejecting the ink). On the other hand, adding the same amount of anionic surfactant to a pigment ink causes no increase in the viscosity of the ink, so that the ink exhibits good startup properties. This type of surfactant, however, causes the ink to be susceptible to pH and other ionic materials. As a result, the ink poses problems such as poor storage stability and clogging due to the reaction with ionic materials from ink flow passageways.

Problems with ink-jet recording pigment inks are summarized below.

1. Startup Properties

For on-demand ink-jet printers, a certain period of suspension from droplet ejection causes relative increases in the concentration of a pigment in the ink remaining at the end of a nozzle with the evaporation of water in the ink to increase the viscosity of the ink at the end of the nozzle. Such a viscous ink cannot be normally ejected, thus exhibiting poor startup properties. In this case, for example, dot placement becomes inaccurate, and the diameter of dots is decreased at the beginning of ejection. Such phenomena are prominent at low humidity, which promotes the evaporation of the ink from the end of the nozzle, and at low temperature, which increases the viscosity of the overall ink. This problem is serious particularly for pigment inks (hereinafter simply referred to as "inks") because these inks contain a dispersing agent, which is a component that is not contained in dye inks.

To address this problem, for example, the ink in the nozzle is replaced by ejecting the ink outside the printing area if the time during which a recording head faces a recording surface is less than or equal to five seconds in succession. Alternatively, in general, printing is frequently stopped to insert recovery operations in which the ink is sucked and pressurized. Large-format printers, for example, require startup properties better than conventional printers because each scan is long. This problem is more serious for printers having a fixed line head because frequent recovery operations cannot be performed in view of structure.

2. Anti-sticking Properties (Anti-clogging Properties for Nozzles)

Another problem caused by the evaporation of water in the ink at the end of a nozzle is clogging due to the sticking of a coloring material. The clogging occurs when, for example, a printer is left unused for a certain period, a printing head integrated with an ink tank is left detached from a printer, or an ink tank detachable from a printing head is left detached from a printer. This phenomenon is markedly severe and has been difficult to deal with about pigment as opposed to dye, since dye, a colorant itself works as a molecule, is soluble to water or a solvent, on the contrary pigment which associates up to 100 nm in particle size is essentially insoluble to water or a solvent. The evaporation of water in the ink causes relative increases in the concentration of a pigment in the ink to develop a network of the pigment, thus deteriorating anti-clogging properties. Even if no water evaporates, an ink having insufficient dispersibility causes aggregation of the pigment. Such an ink often exhibits poor anti-clogging properties immediately after preparation.

3. Storage Stability

Inks are also required to keep stable ejection with no changes in physical properties, such as aggregation or increased viscosity, and with no effects of changes in pH and a material eluted from ink flow passageways after the inks are left at low or high temperature. The storage stability also greatly affects the anti-clogging properties. Especially, as pigment is uniformly dispersed in ink medium by a dispersing agent, the detachment between pigment and dispersing agent happens or the dispersion of the pigment breaks down and the physical property of the ink rapidly changes when the ink is stored. Inks for use in printers that eject ink droplets with volumes of less than or equal to 10 pl are required to achieve a further improvement in the storage stability because a slight effect of, for example, aggregation or increased viscosity on the individual properties is magnified for such printers.

SUMMARY OF THE INVENTION

In light of the above problems in the context of future technological trends, the present inventors have intensively studied a pigment ink for ink-jet recording printers that has excellent fundamental properties, including excellent pigment dispersion stability after long storage and high levels of startup properties and anti-clogging properties, and can support high-definition image recording. As a result of the study, the present inventors have found that the above problems can be solved with a pigment ink containing an anionic surfactant having specific properties.

An object of the present invention is therefore to provide an ink-jet recording ink that is prepared by dispersing a pigment into an aqueous medium with a dispersing agent and provides excellent startup properties, anti-sticking properties, recording head durability, and pigment storage stability after long storage or contact with ink flow passageways.

Another object of the present invention is to provide an ink-jet recording method that offers stable creation of high-quality images.

Still another object of the present invention is to provide an ink cartridge, recording unit, ink-jet recording apparatus, and method for stabilizing ink ejection that are applicable to the above-mentioned ink-jet recording method.

To achieve the above objects, the present invention provides an ink-jet recording ink containing water, a pigment, a dispersing agent for dispersing the pigment, and an anionic surfactant having a critical micelle concentration lower than or equal to 0.0005 mol/L.

For the ink-jet recording ink of the present invention, the effect of the present invention becomes evident when the ink-jet recording ink further contains a nonionic surfactant; the dispersing agent has an anionic, water-soluble functional group; the dispersing agent is a block copolymer; and/or the anionic surfactant has a cyclic peptide in the molecular structure thereof.

The present invention further provides an ink-jet recording method using the above ink-jet recording ink. The effect of the present invention becomes evident when this method is applied to thermal ink-jet recording. In thermal ink-jet recording, an ink is ejected by pressure of bubbles caused by thermal energy from a heater. In the bubbling, in which the ink is exposed to high temperature and pressure, the dispersion of the pigment breaks down to an uncertain extent even if the pigment is highly dispersed. The resultant deposit, which is poorly water-soluble, is burnt on the heater to cause bubbling defects and decreases the amount of ink ejected, thus shortening the life of the head.

The ink-jet recording ink according to the present invention can maintain excellent startup properties, anti-sticking properties, ejection stability with no clogging, ink storage stability, and print durability after long storage or contact with ink flow passageways. The advantage in print durability appears more prominently with use in thermal ink-jet recording. The ink according to the present invention also has the advantage of largely relaxing constraints in the design of printers because this ink is less susceptible to the materials used for ink containers and ink flow passageways.

Further objects, features, and advantages of the present invention will become apparent from the following description of the preferred embodiments with reference to the attached drawings.

DESCRIPTION OF THE PREFERRED EMBODIMENTS

Figure 1:
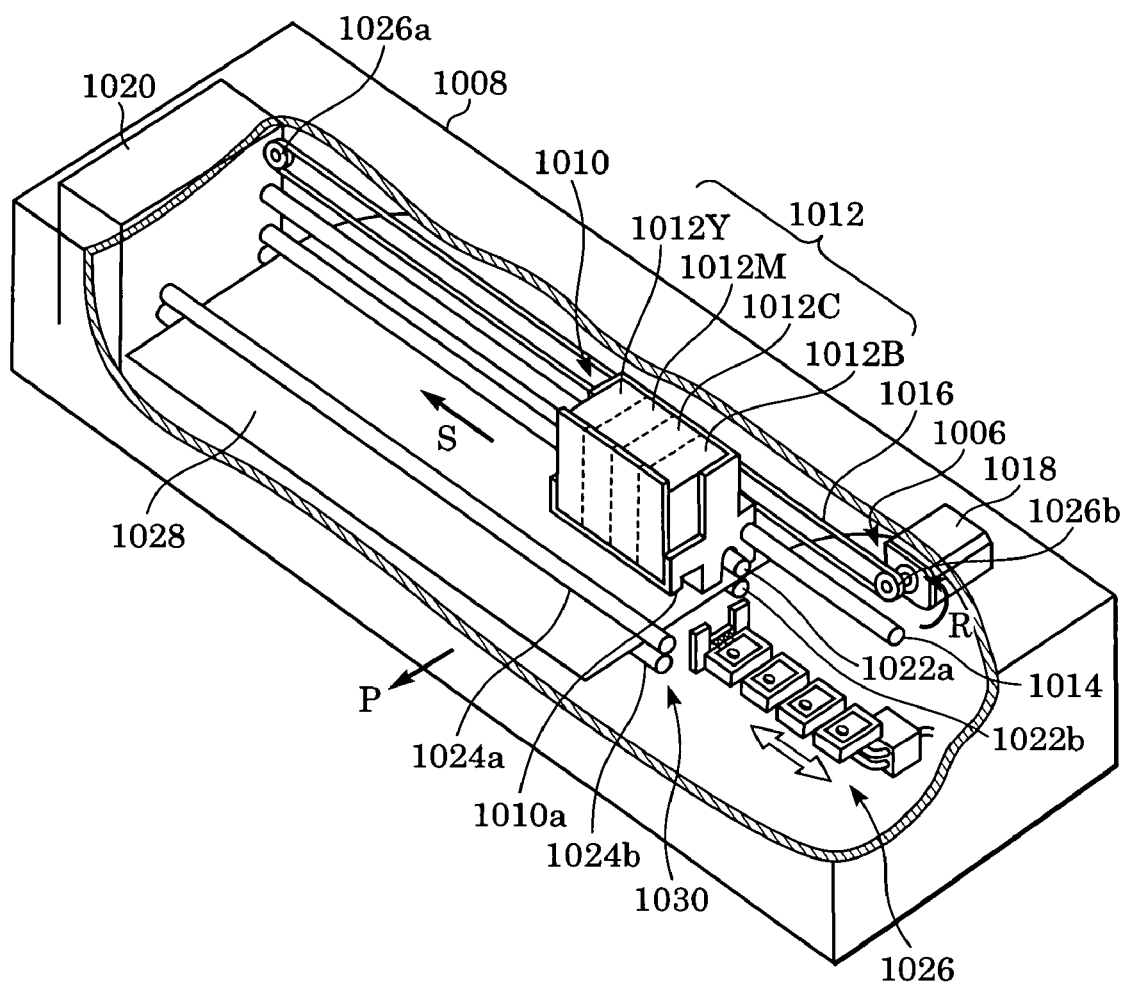
FIG. 1 is a schematic perspective view of the main part of an example of an ink-jet printer that can be equipped with a liquid ejection head.

The present invention will be described in more detail hereinafter with reference to preferred embodiments. An ink according to the present invention is characterized in that it contains water, a pigment, a dispersing agent for dispersing the pigment, and an anionic surfactant having a critical micelle concentration lower than or equal to 0.0005 mol/L. These components are described below.

(Aqueous Medium)

While the ink according to the present invention includes water as an essential component, the content of water in the ink is preferably larger than or equal to 30 percent by mass and smaller than or equal to 95 percent by mass relative to the total mass of the ink.

An aqueous medium using water, water-soluble solvents and a substance together is often used. Examples of the constituting component in combination with water include alkyl alcohols with a carbon number of 1 to 5 such as methyl alcohol, ethyl alcohol, n-propyl alcohol, isopropyl alcohol, n-butyl alcohol, sec-butyl alcohol, tert-butyl alcohol, and n-pentanol; amides such as dimethylformamide and dimethylacetamide; ketones or ketoalcohols such as acetone and diacetone alcohol; ethers such as tetrahydrofuran and dioxane; oxyethylene or oxypropylene polymers such as diethylene glycol, triethylene glycol, tetraethylene glycol, dipropylene glycol, tripropylene glycol, polyethylene glycol, and polypropylene glycol; alkylene glycols in which the alkylene group contains 2 to 6 carbon atoms, such as ethylene glycol, propylene glycol, trimethylene glycol, 1,4-butanediol, and 1,5-pentanediol; triols such as 1,2,6-hexanetriol, glycerin, and trimethylolpropane; lower alkyl ethers of glycols, such as ethylene glycol monomethyl(or ethyl) ether, diethylene glycol monomethyl(or ethyl) ether, and triethylene glycol monomethyl(or ethyl or butyl) ether; lower dialkyl ethers of polyfunctional alcohols, such as triethylene glycol dimethyl(or ethyl) ether and tetraethylene glycol dimethyl(or ethyl) ether; alkanol amines such as monoethanolamine, diethanolamine, and triethanolamine; sulfolane; N-methyl-2-pyrrolidone; 2-pyrrolidone; 1,3-dimethyl-2-imidazolidinone; urea; ethylene urea; and bishydroxyethyl sulfone.

Ethylene glycol, diethylene glycol, triethylene glycol, tetraethylene glycol, polyethylene glycol (average molecular weight of 200 to 1,000), 2-pyrrolidone, glycerin, 1,2,6-hexanetriol, ethylene urea, and trimethylolpropane are preferably used among them, and glycerin is particularly suitable. While the kind and content of the water-soluble solvent to be used together with water are not particularly restricted, the content is preferably more than or equal to 3 percent by mass and lower than or equal to 60 percent by mass relative to the total mass of the ink.

(Surfactant)

The ink according to the present invention should contain an anionic surfactant having a critical micelle concentration lower than or equal to 0.0005 mol/L as a feature of the present invention. Any anionic surfactant having a critical micelle concentration within the above range may be used, for example monosodium lauroyl glutamate. Among such anionic surfactants, those having a cyclic peptide in their molecular structures are preferred.

Specific examples of amino acids contained in the cyclic peptide include glycine, alanine, valine, norvaline, leucine, norleucine, isoleucine, phenylalanine, tyrosine, diiodotyrosine, surinamine, threonine, serine, proline, hydroxyproline, tryptophan, thyroxine, methionine, cystine, cysteine, α-aminobutyric acid, aspartic acid, glutamic acid, asparagine, glutamine, lysine, hydroxylysine, arginine, and histidine.

While the amino acid contained in the surfactant having the cyclic peptide structure is not particularly restricted so long as the critical micelle concentration of the anionic surfactant is in the range of lower than or equal to 0.0005 mol/L, it may comprise a hydrophilic site comprising a cyclic peptide containing 5 to 10 amino acid residues and a branched structure, and a hydrophobic site having a long chain alkyl and/or long chain alkylphenyl site with a carbon number of the main chain of larger than or equal to 8 is preferable. The carboxyl group and salts thereof are suitable as the water-soluble group.

Although the anionic surfactant having the structure as described above with a critical micelle concentration lower than or equal to 0.0005 mol/L may be synthesized by a conventional method, the surfactant having the following structure is preferable.

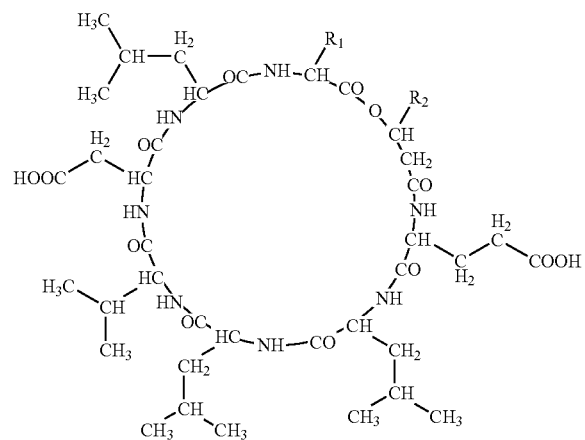

In the formula above, $R_1$ denotes an amino acid residue represented by any one of $CH(CH_3)_2$, $CH_2CH(CH_3)_2$, and $CH(CH_3)CH_2CH_3$, and $R_2$ denotes a long chain alkyl chain represented by any one of $(CH_2)_6CH(CH_3)_2$, $(CH_2)_9CH(CH_3)_2$, and $(CH_2)_{11}CH_3$.

The commercially available substance having the structure above corresponds to Aminofect (trade name; manufactured by Showa Denko Co., critical micelle concentration=0.000003 mol/L, number of amino acid residues=7, number of carboxyl groups=2, number of alkyl chain carbon atoms=12). For example, a substance having a structure in which $R_1$ is $CH_2CH(CH_3)_2$ and $R_2$ is $(CH_2)_9CH(CH_3)_2$ is contained in Aminofect.

The content of the specified anionic surfactant having an extremely low critical micelle concentration and being used in the present invention is 0.00001 to 3 percent by mass, preferably 0.00005 to 2.5 percent by mass, and more preferably 0.0001 to 2 percent by mass, in the total quantity of the ink.

The ink according to the present invention is characterized in that it contains an anionic surfactant having a critical micelle concentration lower than or equal to 0.0005 mol/L. The critical micelle concentration of the anionic surfactant is extremely low and unparalleled in anionic surfactants for use in known ink-jet pigment inks. According to the studies by the present inventors, as described above, adding a nonionic surfactant to a pigment ink provides the ink with less susceptibility to pH and other ionic materials, but tends to increase the viscosity of the ink. Such viscous ink may cause ejection defects due to partial evaporation of the ink components at the end of a nozzle, thus exhibiting poor startup properties. On the other hand, adding an anionic surfactant does not increase the viscosity of the ink, but causes the ink to be susceptible to pH and other ionic materials. As a result, the ink may pose problems such as poor ink storage stability and clogging due to the reaction with ionic materials from ink flow passageways.

For example, the use of a nonionic surfactant alone provides the ink with less susceptibility to pH and other ionic materials, but involves an increase in the initial viscosity of the ink. As a result of studies, the present inventors have found that the use of an anionic surfactant having an extremely low critical micelle concentration as used in the ink according to the present invention is effective against the above problems. Even if most anionic functional groups in the anionic surfactant are affected by pH and other ionic materials contained in the ink, a slight amount of residual anionic surfactant can inhibit changes in the physical properties, particularly surface energy, of the overall ink. This is because, unlike conventional anionic surfactants, the anionic surfactant used in the present invention has an extremely low critical micelle concentration.

The anionic surfactant is preferably used in combination with a nonionic surfactant in the ink according to the present invention to achieve better-balanced ejection stability and print durability before and after the ink is affected by pH and other ionic materials. Concomitant use of the nonionic surfactant such as, for example, polyoxyethylene alkyl ethers such as polyoxyethylene cetyl ether, polyoxyethylene oleyl ether, and polyoxyethylene behenyl ether; and an ethylene oxide adduct of acetylene glycol is preferable. HLB of this nonionic surfactant is higher than or equal to 10, preferably higher than or equal to 13, and more preferably higher than or equal to 15. The content of the nonionic surfactant is 0.01 to 3 percent by mass, preferably 0.05 to 2.5 percent by mass, and more preferably 0.1 to 2 percent by mass in the ink when these nonionic surfactants are used together.

(Additives)

Additives such as a viscosity controlling agent, a defoaming agent, an antiseptic, an antifungal agent, and an antioxidant may be added, if necessary, in addition to the components described above to achieve desired physical properties. Such additives are preferably selected so that the ink has a surface tension of higher than or equal to 25 mN/m, preferably higher than or equal to 28 mN/m.

(Pigment)

Examples of the pigment will be described below as an essential component of the ink according to the present invention. Carbon black is suitable as the pigment used in the black ink. Specific examples of the carbon black pigment include furnace black, lamp black, acetylene black, and channel black. The preferably used carbon black pigment has a primary particle diameter of 15 to 40 nm, a specific surface area by the BET method of 50 to 300 m$^2$/g, DBP oil absorption of 40 to 150 ml/100 g, and a content of volatile fractions of 0.5 to 10%.

The following organic pigments are favorably used as the pigment used in the color ink. Specific examples thereof include insoluble azo pigments such as toluidine red, toluidine maroon, Hansa yellow, benzidine yellow, and pyrazolone red; soluble azo pigments such as lithol red, helio Bordeaux, pigment scarlet, and permanent red 2B; derivatives from vat dyes such as alizarin, indanthrone, and thioindigo maroon; phthalocyanine pigments such as phthalocyanine blue and phthalocyanine green; quinacridone pigments such as quinacridone red and quinacridone magenta; perylene pigments such as perylene red and perylene scarlet; isoindolinone pigments such as isoindolinone yellow and isoindolinone orange; imidazolone pigments such as benzimidazolone yellow, benzimidazolone orange, and benzimidazolone red; pyranthrone pigments such as pyranthrone red and pyranthrone orange; thioindigo pigments; condensed azo pigments; diketopyrrolopyrrole pigments; flavanthrone yellow; acylamide yellow; quinophthalone yellow; nickel azo yellow; copper azomethine yellow; perynone orange; anthrone orange; dianthraquinonyl red; and dioxazine violet.

Examples of the organic pigments represented by color index (C.I.) numbers include C.I. pigment yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, and 185; C.I. pigment orange 16, 36, 43, 51, 55, 59, 61, and 71; C.I. pigment red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, and 272; C.I. pigment violet 19, 23, 29, 30, 37, 40, and 50; C.I. pigment blue 15, 15:1, 15:3, 15:4, 15:6, 22, 60, and 64; C.I. pigment green 7 and 36; and C.I. pigment brown 23, 25, and 26. While pigments other than those described above may be available, C.I. pigment yellow 13, 17, 55, 74, 93, 97, 98, 110, 128, 139, 147, 150, 151, 154, 155, 180, and 185; C.I. pigment red 122, 202, and 209; and C.I. pigment blue 15:3 and 15:4 are more preferable among them.

The amount of addition of the pigment in the ink is preferably 0.1 to 15 percent by mass, more preferably 0.2 to 12 percent by mass, and further preferably 0.3 to 10 percent by mass, although it is not restricted within this range.

(Dispersing Agent for Dispersing Pigment)

Examples of the dispersing agent for dispersing the pigment that is an essential component of the ink according to the present invention will be described below. The dispersing agent used in the present invention may be any dispersing agent that is water-soluble. While the dispersing agent for dispersing the pigment in the present invention is not particularly restricted so long as it is soluble to water, specific examples thereof include block copolymers, random copolymers, graft copolymers, and derivatives thereof comprising at least two monomers (at least one of them is a hydrophilic monomer) selected from styrene, styrene derivatives, vinyl naphthalene, vinyl naphthalene derivatives, alcohol esters of ethylenic α,β-unsaturated carboxylic acid, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acrylamide, and their derivatives. The block copolymer is the particularly preferable dispersing agent for achieving the invention.

The block copolymer has a structure represented by AB, BAB, or ABC. The block copolymer having hydrophobic blocks and hydrophilic blocks with a balanced block size for contributing to dispersion stability is particularly advantageous for achieving the present invention. Such a block copolymer is able to integrate functional groups into the hydrophobic block (a block for binding the colorant), and specific interaction between the dispersing agent and pigment for improving dispersion stability may be further enhanced. Such a block copolymer is more preferable due to its rheological compatibility when it is used for the ink-jet recording method taking advantage of heat energy, particularly for the ink-jet recording head compatible with small droplets (with a volume of 0.1 to 20 pl, preferably 0.1 to 15 pl, more preferably 0.1 to 10 pl). The amount of the polymer in the ink depends on the structure, molecular weight, and other characteristics of the polymer, and other components of the ink composition. The weight average molecular weight selected for achieving the present invention is less than 30,000, preferably less than 20,000, and more preferably in the range of 2,000 to 10,000.

The method for manufacturing these polymers, and the method for dispersing the pigment are disclosed in detail in Japanese Patent Laid-Open Nos. 05-179183, 06-136311, 07-053841, 10-87768, 11-043639, 11-236502, and 11-269418.

While representative hydrophobic monomers available for the block copolymer are as follows, the present invention is not restricted to these monomers. Examples thereof include benzyl acrylate, benzyl methacrylate, methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, 2-phenylethyl methacrylate, hydroxyethyl acrylate, hydroxypropyl acrylate, acrylonitrile, 2-trimethylsiloxyethyl acrylate, glycidyl acrylate, p-tolyl acrylate, and sorbyl acrylate. Preferable hydrophobic monomers are benzyl acrylate, benzyl methacrylate, 2-phenylethyl methacrylate, methyl methacrylate, butyl methacrylate, and 2-ethylhexyl methacrylate. It is preferable to produce homopolymers and copolymers, for example block copolymers, using a copolymer of methyl methacrylate and butyl methacrylate.

While representative hydrophilic monomers available for the block copolymer are as follows, the present invention is not restricted thereto. Examples of them include methacrylic acid (MAA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethyl acrylamide. The block copolymer is preferably produced using a homopolymer or copolymer of methacrylic acid, acrylic acid, or dimethylaminoethyl methacrylate.

Polymers containing acids may be directly produced, or produced from blocked monomers having blocking groups that are eliminated after polymerization. Examples of the blocked monomer that generates acrylic acid or methacrylic acid after eliminating the blocking group include trimethylsilyl methacrylate (TMSMA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

Allowing the block copolymers as described above to be contained in the ink according to the present invention permits ink ejection stability to be more evidently improved, particularly when the ink-jet recording head using the thermal energy is actuated at a high frequency, for example at a frequency higher than or equal to 5 kHz.

The content of the dispersing agent as described above in the ink is 0.5 to 10 percent by mass, preferably 0.8 to 8 percent by mass, and more preferably 1 to 6 percent by mass. A desired viscosity of the ink can hardly be maintained when the content of the pigment dispersing agent in the ink is higher than the above range.

While the components constituting the ink of the present invention have been described above, the average particle diameter of the pigment in the pigment dispersion as the ink of the present invention is preferably in the range of 50 to 200 nm. The average particle diameter can be measured using ELS-8000 (trade name, manufactured by Otsuka Electronics Co.) or Micro Track UPA 150 (trade name, manufactured by Nikkiso Co.).

(Ink-jet Recording Apparatus and Other Components)

An ink-jet printer will now be described as an example of ink-jet recording apparatuses according to the present invention. FIG. 1 is a schematic perspective view of the main part of the ink-jet printer, which includes a liquid ejection head that ejects a liquid with air bubbles.

Referring to FIG. 1, the ink-jet printer includes a casing 1008, a feeder 1030, a recording part 1010, and a drive part 1006. A sheet 1028, as a recording medium, is set into the casing 1008 in the longitudinal direction. The feeder 1030 intermittently feeds the sheet 1028 in the direction indicated by the arrow P. The drive part 1006 reciprocates the recording part 1010 along a guide shaft 1014 in the direction indicated by the arrow S, which is substantially orthogonal to that indicated by the arrow P.

The feeder 1030 includes a pair of roller units 1022a and 1022b that are opposed substantially in parallel, another pair of roller units 1024a and 1024b, and a drive unit 1020 for driving the roller units 1022a, 1022b, 1024a, and 1024b. The drive unit 1020 of the feeder 1030 is actuated to feed the sheet 1028 intermittently through the nip between the roller units 1022a and 1022b and that between the roller units 1024a and 1024b in the direction indicated by the arrow P. The drive part 1006 includes pulleys 1026a and 1026b provided around rotating shafts opposed at a predetermined distance, a belt 1016 that is looped over the pulleys 1026a and 1026b substantially in parallel with the roller units 1022a and 1022b and is coupled to a carriage 1010a of the recording part 1010, and a motor 1018 that runs the belt 1016 in the forward and reverse directions.

When the motor 1018 starts to run the belt 1016 in the direction indicated by the arrow R, the carriage 1010a of the recording part 1010 moves in the direction indicated by the arrow S by a predetermined distance. When the motor 1018 starts to run the belt 1016 in the opposite direction to that indicated by the arrow R, the carriage 1010a of the recording part 1010 moves in the opposite direction to that indicated by the arrow S by a predetermined distance. A recovery unit 1026 for ejection recovery operation of the recording part 1010 is disposed in the home position of the carriage 1010a at one end of the drive part 1006. This recovery unit 1026 faces ink ejection outlets of the recording part 1010 in the home position.

The recording part 1010 includes the carriage 1010a and ink-jet cartridges (hereinafter also simply referred to as cartridges) 1012Y, 1012M, 1012C, and 1012B mounted on the carriage 1010a. The ink-jet cartridges 1012Y, 1012M, 1012C, and 1012B correspond to, for example, yellow, magenta, cyan, and black, respectively, and are detachable from the carriage 1010a.

Figure 2:
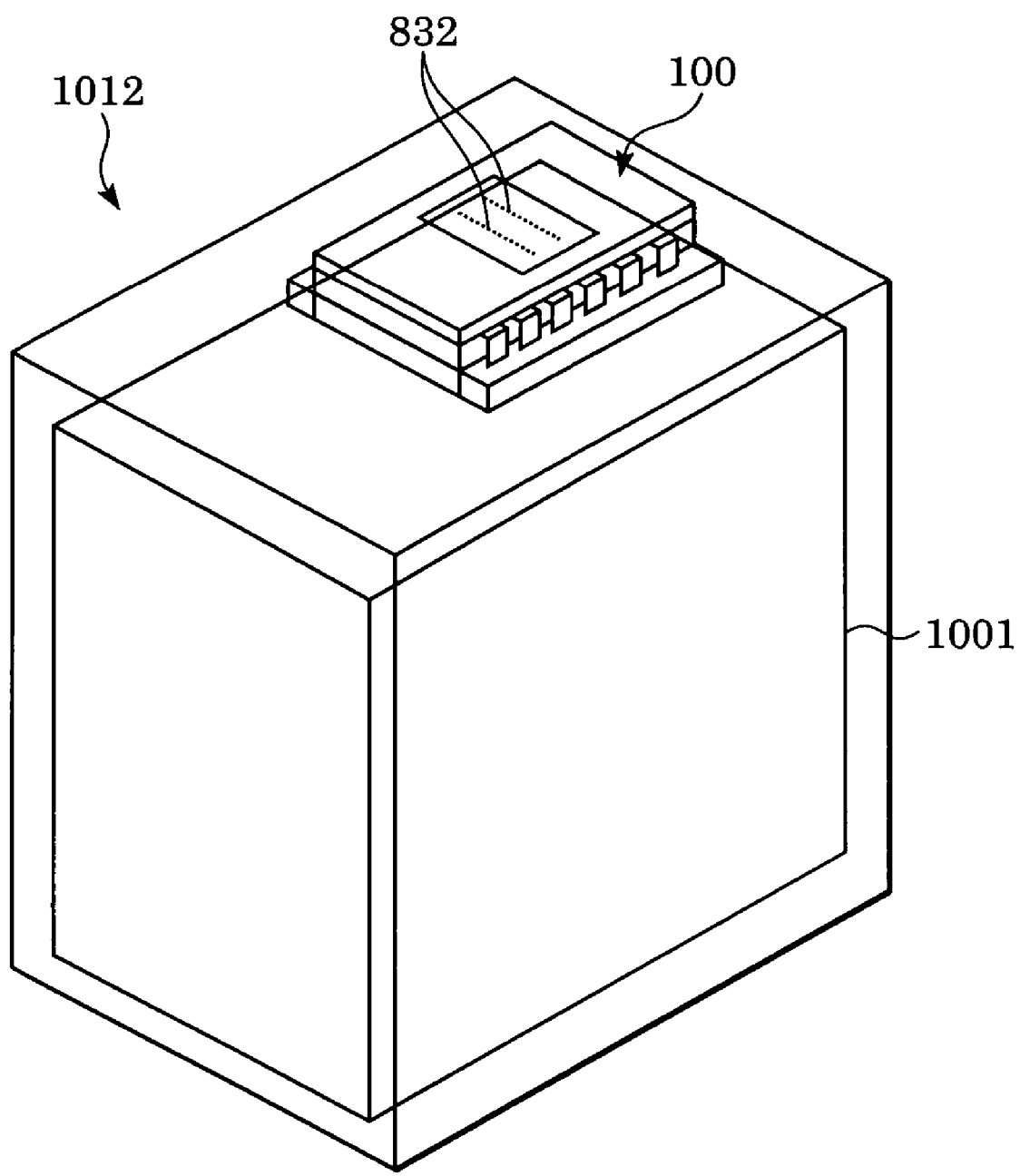
FIG. 2 is a schematic perspective view of an example of an ink-jet cartridge equipped with a liquid ejection head.

FIG. 2 shows an example of ink-jet cartridges mountable on the above ink-jet recording apparatus. In FIG. 2, a serial ink-jet cartridge 1012 mainly includes an ink-jet recording head 100 and an ink tank 1001 for storing an ink.

The ink-jet recording head 100 has many ejection outlets 832 for ejecting an ink. The ink stored in the ink tank 1001 is supplied to a common ink chamber (not shown) in the ink-jet recording head 100 through ink supply passageways (not shown). In FIG. 2, the ink-jet recording head 100 and the ink tank 1001 are integrated, and the ink tank 1001 can be supplied with an ink according to need. Alternatively, the ink tank 1001 may be removable from the ink-jet recording head 100. A recording unit refers to an ink-jet cartridge equipped with an ink-jet recording head.

EXAMPLES

The present invention will be described in detail with reference to examples and comparative examples. "Parts" and "%" in the descriptions are based on mass unless otherwise mentioned.

Example 1

Ink 1

(Preparation of Pigment Dispersion Solution 1)

A block polymer of AB type with an acid value of 250 and weight average molecular weight of 3,000 was prepared by a conventional method using benzyl methacrylate and methacrylic acid as starting materials. The product was neutralized with an aqueous potassium hydroxide solution to prepare a uniform aqueous polymer solution with a concentration of 50% by diluting with ion-exchange water. The aqueous polymer solution (180 g) obtained and C.I. pigment blue 15:3 (100 g) were mixed with 220 g of ion-exchange water, and the solution was mechanically stirred for 0.5 hours. Then, the mixture was treated by passing through an interaction chamber five times under a hydraulic pressure of about 10,000 psi (about 70 MPa) using a microfluidizer. Cyan color pigment dispersion solution 1 was prepared by removing non-dispersed substances including coarse particles by centrifuging (12,000 rpm, 20 minutes) the dispersion solution obtained above. The pigment dispersion solution 1 obtained had a pigment concentration of 10% and dispersing agent concentration of 10%.

(Preparation of Ink 1)

Cyan color pigment dispersion solution 1 obtained above was used for preparing ink 1. The following components were added to the dispersion solution in prescribed concentrations, and after thoroughly mixing these components, the solution was filtered by pressurizing using a micro-filter (manufactured by Fuji Film Co.) with a pore size of 2.5 μm to prepare ink 1 with a pigment concentration of 2% and dispersing agent concentration of 2%. Aminofect (trade name, manufactured by Showa Denko Co., critical micelle concentration=0.000003 mol/L) as an anionic surfactant having a cyclic peptide structure was added to ink 1 as shown below. Polyoxyethylene cetyl ether and ethylene oxide adduct of acetylene glycol as a nonionic surfactant was also used together.

| | |
|---|---|
| pigment dispersion solution 1 | 20 parts |
| glycerin | 7 parts |
| trimethylolpropane | 8 parts |
| ethylene urea | 2 parts |
| polyoxyethylene cetyl ether (number of ethylene oxide adducts = 30, HLB = 19.5) | 0.5 parts |
| anionic surfactant having cyclic peptide structure | 0.5 parts |
| ethylene oxide adduct of acetylene glycol (trade name: Acetylenol EH, manufactured by Kawaken Fine Chemicals Co.) | 0.3 parts |
| ion-exchange water | 61.7 parts |

Example 2

Ink 2

(Preparation of Pigment Dispersion Solution 2)

The same polymer solution (100 g) used in the preparation of pigment dispersion solution 1, C.I. pigment red 122 (100 g), and ion-exchange water (300 g) were mixed and mechanically stirred for 0.5 hours. Then, the mixture was treated by passing through an interaction chamber five times under a hydraulic pressure of about 10,000 psi (about 70 MPa) using a microfluidizer. Magenta color pigment dispersion solution 2 was prepared by removing non-dispersed substances including coarse particles by centrifuging (12,000 rpm, 20 minutes) the dispersion solution obtained above. The pigment dispersion solution 2 obtained had a pigment concentration of 10% and dispersing agent concentration of 5%.

(Preparation of Ink 2)

Magenta color pigment dispersion solution 2 obtained above was used for preparing ink 2. The following components were added to the dispersion solution in prescribed concentrations, and after thoroughly mixing these components, the solution was filtered by pressurizing using a micro-filter (manufactured by Fuji Film Co.) with a pore size of 2.5 μm to prepare ink 2 with a pigment concentration of 4% and dispersing agent concentration of 2%. Aminofect (trade name, manufactured by Showa Denko Co., critical micelle concentration=0.000003 mol/L) as an anionic surfactant having a cyclic peptide structure was added to ink 2 as shown below. Polyoxyethylene cetyl ether and ethylene oxide adduct of acetylene glycol as a nonionic surfactant was also used together.

| | |
|---|---|
| pigment dispersion solution 2 | 40 parts |
| glycerin | 7 parts |
| ethylene urea | 2 parts |
| 2-pyrrolidone | 3 parts |
| 1,2,6-hexanetriol | 5 parts |
| polyoxyethylene cetyl ether (number of ethylene oxide adduct = 20, HLB = 17) | 0.1 parts |
| anionic surfactant having cyclic peptide structure | 1 part |
| ethylene oxide adduct of acetylene glycol (trade name: Acetylenol EH, manufactured by Kawaken Fine Chemicals Co.) | 0.3 parts |
| ion-exchange water | 41.6 parts |

Example 3

Ink 3

(Preparation of Pigment Dispersion Solution 3)

A block polymer of AB type with an acid value of 300 and weight average molecular weight of 4,000 was prepared by a conventional method using benzyl acrylate and methacrylic acid as starting materials. The product was neutralized with an aqueous potassium hydroxide solution to prepare a uniform aqueous polymer solution with a concentration of 50% by diluting with ion-exchange water. The aqueous polymer solution (110 g) obtained and C.I. pigment yellow 128 (100 g) were mixed with 290 g of ion-exchange water, and the solution was mechanically stirred for 0.5 hours. Then, the mixture was treated by passing through an interaction chamber five times under a hydraulic pressure of about 10,000 psi (about 70 MPa) using a microfluidizer. Yellow color pigment dispersion solution 3 was prepared by removing non-dispersed substances including coarse particles by centrifuging (12,000 rpm, 20 minutes) the dispersion solution obtained above. The pigment dispersion solution 3 obtained had a pigment concentration of 10% and dispersing agent concentration of 6%.

(Preparation of Ink 3)

Yellow color pigment dispersion solution 3 obtained above was used for preparing ink 3. The following components were added to the dispersion solution in prescribed concentrations, and after thoroughly mixing these components, the solution was filtered by pressurizing using a micro-filter (manufactured by Fuji Film Co.) with a pore size of 2.5 μm to prepare ink 3 with a pigment concentration of 5% and dispersing agent concentration of 3%. Monosodium lauroyl glutamate (critical micelle concentration=0.0003 mol/L) as an anionic surfactant was added to ink 3 as shown below. Polyoxyethylene oleyl ether and ethylene oxide adduct of acetylene glycol as a nonionic surfactant was also used together.

| | |
|---|---|
| pigment dispersion solution 3 | 50 parts |
| glycerin | 6 parts |
| polyethylene glycol (average molecular weight = 200) | 2 parts |
| diethylene glycol | 4 parts |
| ethylene glycol | 5 parts |
| polyoxyethylene oleyl ether (number of ethylene oxide adduct = 10, HLB = 14.5) | 0.5 parts |
| monosodium lauroyl glutamate | 0.3 parts |
| ethylene oxide adduct of acetylene glycol (trade name: Surfynol 440, manufactured by Air Products and Chemicals, Inc.) | 0.2 parts |
| ion-exchange water | 32 parts |

Example 4

Ink 4

(Preparation of Pigment Dispersion Solution 4)

A block polymer of ABC type with an acid value of 350 and weight average molecular weight of 5,000 was prepared by a conventional method using benzyl methacrylate, methacrylic acid, and 2-ethoxyethyl methacrylate as starting materials. The product was neutralized with an aqueous potassium hydroxide solution to prepare a uniform aqueous polymer solution with a concentration of 50% by diluting with ion-exchange water. The aqueous polymer solution (60 g) and carbon black (100 g) were mixed with 340 g of ion-exchange water, and the solution was mechanically stirred for 0.5 hours. Then, the mixture was treated by passing through an interaction chamber five times under a hydraulic pressure of about 10,000 psi (about 70 MPa) using a microfluidizer. Black color pigment dispersion solution 4 was prepared by removing non-dispersed substances including coarse particles by centrifuging (12,000 rpm, 20 minutes) the dispersion solution obtained above. The pigment dispersion solution 4 obtained had a pigment concentration of 10% and dispersing agent concentration of 3.5%.

(Preparation of Ink 4)

Black color pigment dispersion solution 4 obtained above was used for preparing ink 4. The following components were added to the dispersion solution in prescribed concentrations (adjusted to 100 parts in total by adding ion-exchange water), and after thoroughly mixing these components, the solution was filtered by pressurizing using a micro-filter (manufactured by Fuji Film Co.) with a pore size of 2.5 μm to prepare ink 4 with a pigment concentration of 3% and dispersing agent concentration of 1.05%. Aminofect (trade name, manufactured by Showa Denko Co., critical micelle concentration=0.000003 mol/L) as an anionic surfactant having a cyclic peptide structure was added to ink 4 as shown below. Polyoxyethylene behenyl ether and ethylene oxide adduct of acetylene glycol as a nonionic surfactant was also used together.

| | |
|---|---|
| pigment dispersion solution 4 | 30 parts |
| glycerin | 3 parts |
| ethylene urea | 6 parts |
| triethylene glycol | 4 parts |
| polyethylene glycol (average molecular weight = 400) | 2 parts |
| polyoxyethylene behenyl ether (number of ethylene oxide adduct = 20, HLB = 16.5) | 1.5 parts |
| anionic surfactant having cyclic peptide structure | 0.1 parts |
| ethylene oxide adduct of acetylene glycol (trade name: Acetylenol EH, manufactured by Kawaken Fine Chemicals Co.) | 0.3 parts |
| ion-exchange water | 53.1 parts |

Example 5

Ink 5

(Preparation of Pigment Dispersion Solution 5)

A block polymer of ABC type with an acid value of 350 and weight average molecular weight of 2,500 was prepared by a conventional method using benzyl acrylate, methacrylic acid, and 2-ethoxyethyl methacrylate as starting materials. The product was neutralized with an aqueous potassium hydroxide solution to prepare a uniform aqueous polymer solution with a concentration of 50% by diluting with ion-exchange water. The aqueous polymer solution (550 g) and C.I. pigment blue 15:4 (100 g) were mixed with 350 g of ion-exchange water, and the solution was mechanically stirred for 0.5 hours. Then, the mixture was treated by passing through an interaction chamber five times under a hydraulic pressure of about 10,000 psi (about 70 MPa) using a microfluidizer. Cyan color pigment dispersion solution 5 was prepared by removing non-dispersed substances including coarse particles by centrifuging (12,000 rpm, 20 minutes) the dispersion solution obtained above. The pigment dispersion solution 5 obtained had a pigment concentration of 5% and dispersing agent concentration of 15%.

(Preparation of Ink 5)

Cyan color pigment dispersion solution 5 obtained above was used for preparing ink 5. The following components were added to the dispersion solution in prescribed concentrations, and after thoroughly mixing these components, the solution was filtered by pressurizing using a micro-filter (manufactured by Fuji Film Co.) with a pore size of 2.5 μm to prepare ink 5 with a pigment concentration of 0.3% and dispersing agent concentration of 3%. Polyoxyethylene behenyl ether and ethylene oxide adduct of acetylene glycol as a nonionic surfactant was also used together.

| | |
|---|---|
| pigment dispersion solution 5 | 30 parts |
| above 50% polymer solution | 4.2 parts |
| glycerin | 10 parts |
| tetraethylene glycol | 3 parts |
| ethylene urea | 10 parts |
| polyoxyethylene behenyl ether (number of ethylene oxide adduct = 15, HLB = 14) | 0.5 parts |
| anionic surfactant having cyclic peptide structure | 0.01 parts |
| ethylene oxide adduct of acetylene glycol (trade name: Acetylenol EH, manufactured by Kawaken Fine Chemicals Co.) | 0.3 parts |
| ion-exchange water | 65.99 parts |

Comparative Example 1

Ink 6

(Preparation of Ink 6)

Cyan color pigment dispersion solution 1 used for the preparation of ink 1 was used for preparing ink 6. The following components were added to the dispersion solution in prescribed concentrations, and after thoroughly mixing these components, the solution was filtered by pressurizing using a micro-filter (manufactured by Fuji Film Co.) with a pore size of 2.5 μm to prepare ink 6 with a pigment concentration of 4% and dispersing agent concentration of 2%. As shown below, ink 6 contained no surfactant.

| | |
|---|---|
| pigment dispersion solution 1 | 20 parts |
| glycerin | 7 parts |
| trimethylolpropane | 8 parts |
| ethylene urea | 2 parts |
| ion-exchange water | 63 parts |

Comparative Example 2

Ink 7

(Preparation of Ink 7)

Cyan color pigment dispersion solution 1 used for the preparation of ink 1 was used for preparing ink 7. The following components were added to the dispersion solution in prescribed concentrations, and after thoroughly mixing these components, the solution was filtered by pressurizing using a micro-filter (manufactured by Fuji Film Co.) with a pore size of 2.5 μm to prepare ink 7 with a pigment concentration of 2% and dispersing agent concentration of 2%. As shown below, ink 7 contained no anionic surfactant, and contained only polyoxyethylene cetyl ether and ethylene oxide adduct of acetylene glycol as a nonionic surfactant.

| | |
|---|---|
| pigment dispersion solution 1 | 20 parts |
| glycerin | 7 parts |
| trimethylolpropane | 8 parts |
| ethylene urea | 2 parts |
| polyoxyethylene cetyl ether (number of ethylene oxide adduct = 30, HLB = 19.5) | 1 part |
| ethylene oxide adduct of acetylene glycol (trade name: Acetylenol EH, manufactured by Kawaken Fine Chemicals Co.) | 0.3 parts |
| ion-exchange water | 61.7 parts |

Comparative Example 3

Ink 8

(Preparation of Ink 8)

Magenta color pigment dispersion solution 2 used for the preparation of ink 2 was used for preparing ink 8. The following components were added to the dispersion solution in prescribed concentrations, and after thoroughly mixing these components, the solution was filtered by pressurizing using a micro-filter (manufactured by Fuji Film Co.) with a pore size of 2.5 μm to prepare ink 8 with a pigment concentration of 4% and dispersing agent concentration of 2%. Sodium lauryl sulfate (critical micelle concentration=0.0082 mol/L) as an anionic surfactant was added to ink 8 as shown below. Polyoxyethylene cetyl ether and ethylene oxide adduct of acetylene glycol as a nonionic surfactant was also used together.

| | |
|---|---|
| pigment dispersion solution 2 | 40 parts |
| glycerin | 7 parts |
| ethylene urea | 2 parts |
| 2-pyrrolidone | 3 parts |
| 1,2,6-hexanetriol | 5 parts |
| polyoxyethylene cetyl ether (number of ethylene oxide adduct = 20, HLB = 17) | 0.1 parts |
| sodium lauryl sulfate | 1 part |
| ethylene oxide adduct of acetylene glycol (trade name: Acetylenol EH, manufactured by Kawaken Fine Chemicals Co.) | 0.3 parts |
| ion-exchange water | 41.6 parts |

<Evaluation>

The inks prepared in Examples 1 to 5 (inks 1 to 5) and Comparative Examples 1 to 3 (inks 6 to 8) and those after storage in a polyethylene container at 60° C. for one month were evaluated in the following manner. Ink container was filled with each ink. The ink container was then mounted on a color ink-jet recording apparatus (W8200 Color Bubble Jet® Large-Format Printer, Pg ink model, manufactured by Canon Kabushiki Kaisha). This printer had on-demand recording heads that ejected an ink with thermal energy according to recording signals. The size of each ink droplet ejected from the heads was about 8.5 pl. The above inks were evaluated by the following evaluation methods and evaluation criteria.

(Evaluation Methods)

(1) Startup Properties

After head cleaning, the printer was turned off at 25° C. and a humidity of 10%, was left at the same temperature and humidity for two hours, and was turned on to examine the initial print condition. The results were evaluated by the following criteria, and the results were shown in Table 1.

A: no difference from the print condition before the suspension

B: a slight difference from the print condition before the suspension

C: an obvious difference from the print condition before the suspension (2) Anti-Sticking Properties A head mounted on the printer at 35° C. and a humidity of 10% was removed, was left for one week, and was mounted on the printer to check whether or not the printing can be recovered by normal recovery operation. The results were evaluated by the following criteria, and the results were shown in Table 1.

A: recoverable by one recovery operation

B: recoverable by several recovery operations

C: unrecoverable by recovery operations (3) Print Durability

Using the above printer, each ink was continuously ejected from 20 nozzles by applying $3 \times 10^8$ pulses at a drive frequency of 7.5 kHz. Then, solid patterns were printed using the used nozzles and unused nozzles to visually evaluate the difference in density between the printed patterns. If the dispersion of the pigment in the ink breaks down in the vicinity of a heater at a high drive frequency, namely 7.5 kHz, a deposit sticks to the surface of the heater. As a result, a difference occurs between the patterns printed using the used nozzles and those printed using the unused nozzles. The results were evaluated by the following criteria, and the results were shown in Table 1.

A: no difference between the patterns printed using the used nozzles and those printed using the unused nozzles B: a slight difference between the patterns printed using the used nozzles and those printed using the unused nozzles C: an obvious difference between the patterns printed using the used nozzles and those printed using the unused nozzles (4) Ink Storage Stability First, 100 g of each ink was put into a heat-resistant glass bottle. These bottles were hermetically sealed and were stored in a constant temperature bath at 60° C. for two months. The viscosity and particle diameters of the inks were measured to evaluate whether any change occurred after the storage. The results were evaluated by the following criteria, and the results were shown in Table 1.

A: a change less than 5% in viscosity and particle diameter after the storage.

B: a change more than or equal to 5% and less than 10% in viscosity and particle diameter after the storage.

C: a change more than or equal to 10% in viscosity and particle diameter after the storage.

Table 1 below summarizes the evaluations of the inks prepared in Examples 1 to 5 (inks 1 to 5) and Comparative Examples 1 to 3 (inks 6 to 8) and those after storage in a polyethylene container at 60° C. for one month for the above evaluation methods (1) to (4). In each evaluation method, rank B or above was determined to be effective as an ink-jet recording pigment ink in terms of performance.

TABLE 1

| | | Evaluation object | (1) Startup properties | (2) Anti-sticking properties | (3) Print durability | (4) Ink storage stability |
|---|---|---|---|---|---|---|
| Example | 1 | Ink after preparation | A | A | A | A |
| | | Ink after storage | A | A | A | A |
| | 2 | Ink after preparation | A | A | A | A |
| | | Ink after storage | A | A | A | A |
| | 3 | Ink after preparation | A | A | A | A |
| | | Ink after storage | B | A | B | A |
| | 4 | Ink after preparation | A | A | A | A |
| | | Ink after storage | A | A | A | A |
| | 5 | Ink after preparation | A | A | A | A |
| | | Ink after storage | A | A | A | A |
| Comparative Example | 1 | Ink after preparation | C | B | C | C |
| | | Ink after storage | C | B | C | C |
| | 2 | Ink after preparation | A | A | A | A |
| | | Ink after storage | B | C | C | C |
| | 3 | Ink after preparation | A | B | B | B |
| | | Ink after storage | B | C | C | C |

Reference Example

Ink 9

(Preparation of Ink 9)

Ink 9 was prepared by the same method as in ink 6, except that the cyan color pigment dispersion solution 1 was changed to C.I. direct blue 199 and the content of colorant and ion-exchange water were changed to 2 parts and 81 parts, respectively. Ink 9 after preparation and ink 9 after storage were evaluated in the above mentioned manner. The result was all "A" in four evaluation objects of the present invention. That is to say, the issue of the present invention does not occur in the dye ink and the constitution of the present invention is unnecessary.

The results of the above evaluation methods (1), (2), and (4) confirmed that inks 1 to 5 in Examples 1 to 5 maintained excellent ink-jet suitability after the storage in a polyethylene container. In addition, the results of the evaluation method (3) confirmed that these inks also maintained excellent ejection stability in terms of print durability. On the other hand, inks 6 to 8 in Comparative Examples 1 to 3 exhibited lower performance, particularly after the storage. These results show that the inks according to the present invention had excellent ink-jet ejection suitability and storage stability.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-415798 filed Dec. 12, 2003, which is hereby incorporated by reference herein.

What is claimed is:

1. An ink-jet recording ink comprising:
   water;
   a pigment;
   a dispersing agent for dispersing the pigment; and
   an anionic surfactant having a critical micelle concentration lower than or equal to 0.0005 mol/L,
   wherein the anionic surfactant comprises a cyclic peptide in the molecular structure thereof.

2. The ink-jet recording ink according to claim 1, further comprising a nonionic surfactant.

3. The ink-jet recording ink according to claim 1, wherein the dispersing agent comprises an anionic, water-soluble functional group.

4. The ink-jet recording ink according to claim 1, wherein the dispersing agent is a block copolymer.

5. The ink-jet recording ink according to claim 1, which is a thermal ink-jet ink.

6. An ink cartridge comprising an ink container containing the ink-jet recording ink according to claim 1.

7. A recording unit comprising:
   an ink container containing the ink-jet recording ink according to claim 1; and
   an ink-jet head for ejecting the ink-jet recording ink.

8. The recording unit according to claim 7, wherein the ink-jet head is a thermal ink-jet head.

9. An ink-jet recording method comprising the step of ejecting the ink-jet recording ink according to claim 1 from an ink-jet head.

10. The ink-jet recording method according to claim 9, wherein the ink-jet head is a thermal ink-jet head.

11. The ink-jet recording method according to claim 9, wherein an amount of the ink ejected from the ink-jet head is less than or equal to 20 pl for each ejection operation.

12. The ink-jet recording method according to claim 10, wherein the ink-jet head is driven at a frequency higher than or equal to 5 kHz.

13. An ink-jet recording apparatus comprising:
   an ink container containing the ink-jet recording ink according to claim 1; and
   an ink-jet head for ejecting the ink-jet recording ink.

14. The ink-jet recording apparatus according to claim 13, wherein the ink-jet head is a thermal ink-jet head.

15. A method for stabilizing ink ejection in ink-jet recording, the method comprising the steps of:
   preparing an ink-jet recording ink according to claim 5, and
   ejecting the prepared ink-jet recording ink from a thermal ink-jet head that ejects the ink in an amount of less than or equal to 20 pl for each ejection operation by driving the ink-jet head at a frequency higher than or equal to 5 kHz.

16. The ink-jet recording ink according to claim 1, wherein a content of the anionic surfactant is 0.00001 to 3 percent by mass.

17. The ink-jet recording ink according to claim 2, wherein a content of the nonionic surfactant is 0.01 to 3 percent by mass.

* * * * *